(12) United States Patent
Kumar Kn et al.

(10) Patent No.: US 9,361,247 B1
(45) Date of Patent: Jun. 7, 2016

(54) INTRINSIC BARRIER DEVICE WITH SOFTWARE CONFIGURABLE IO TYPE

(71) Applicant: HONEYWELL INTERNATIONAL INC., Morristown, NJ (US)

(72) Inventors: Dinesh Kumar Kn, Karnataka (IN); Paul Gerhart, North Wales, PA (US); Sai Krishnan Jagannathan, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/546,211

(22) Filed: Nov. 18, 2014

(51) Int. Cl.
*G06F 15/177* (2006.01)
*G06F 13/10* (2006.01)
*G06F 13/20* (2006.01)

(52) U.S. Cl.
CPC .............. *G06F 13/102* (2013.01); *G06F 13/20* (2013.01)

(58) Field of Classification Search
CPC ............................... G06F 13/102; G06F 13/20
See application file for complete search history.

(56) References Cited

U.S. PATENT DOCUMENTS

| | | | | | |
|---|---|---|---|---|---|
| 5,712,631 | A | * | 1/1998 | Lewis ..................... | G08C 19/02 340/853.1 |
| 6,397,322 | B1 | * | 5/2002 | Voss ....................... | H02H 9/008 340/532 |
| 6,885,949 | B2 | * | 4/2005 | Selli ....................... | G01D 21/00 700/79 |
| 8,392,626 | B2 | | 3/2013 | Wormmeester et al. | |
| 8,656,065 | B1 | | 2/2014 | Gerhart et al. | |
| 2004/0019440 | A1 | * | 1/2004 | Selli ....................... | G01D 21/00 702/57 |

FOREIGN PATENT DOCUMENTS

| | | |
|---|---|---|
| DE | 19512372 A1 | 10/1996 |
| EP | 1653305 A2 | 5/2006 |
| WO | 2005086110 A2 | 9/2005 |
| WO | 2012161942 A2 | 11/2012 |
| WO | 2013110296 A1 | 8/2013 |

* cited by examiner

*Primary Examiner* — Long Pham
(74) *Attorney, Agent, or Firm* — Jetter & Associates, P.A.

(57) ABSTRACT

An intrinsic barrier device, method and computer program product for isolating a communication channel of an input/output (IO) module from a field device. The intrinsic barrier device includes a front end having a programming input adapted to receive an analog input (AI), analog output (AO), digital input (DI) or digital output (DO) IO type configuration signal. The intrinsic barrier device also includes a processor to process the IO type configuration signal and an associated memory device storing an intrinsic barrier IO type configuration (IBTC) program. The processor is programmed to implement the IBTC program. The processor, responsive to the IO type configuration signal configures the intrinsic barrier device to operate as the AI, AO, DI or DO for supporting communications through the intrinsic barrier device over the communication channel between the IO module and the field device in the AI, AO, DI or DO.

20 Claims, 6 Drawing Sheets

INTRINSIC BARRIER DEVICE WITH SOFTWARE CONFIGURABLE IO TYPE

FIELD

Disclosed embodiments generally relate to an intrinsic barrier device with a software configurable IO type and, more specifically relate to an intrinsic barrier device for conveying signals to or from a field device located in a hazardous area.

BACKGROUND

In industrial or manufacturing settings, such as for petroleum refining, data, measurement values, control signals, and the like are generally transferred between control systems and one or more field devices (e.g., sensors or actuators), requiring a large number of interface circuits. The connection or input/output (IO) pins for conventional interface circuits communicating with the industrial environment are typically designated in general, based on the function for the IO pins. Generally, the function of an IO pin is determined by the physical properties of the signal, upstream or downstream higher system functions, and the system configuration. The field devices present interfaces that generally fall into one of four input/output (IO) function categories, Analog Input (AI), Digital Input (DI), Analog Output (AO), or Digital Output (DO).

In a hazardous environment, the interface circuits to the field devices are required to be intrinsically safe devices. An intrinsically safe device is defined as being incapable of releasing electrical or thermal energy to cause ignition of a volatile gas or gaseous mixture. Typically, an intrinsically safe environment has a safe side and a hazardous side. The device located on the hazardous side must meet the intrinsically safe requirements. The associated devices located on the safe side and electronically linked to the device located on the hazardous side must also be intrinsically safe.

In an intrinsically safe application, it is a common practice to use an intrinsically safe barrier as a safety buffer between a device located on the hazardous side and an apparatus located on the safe side. For example, when a thermocouple is placed in a hazardous area to measure a temperature, the thermocouple is connected to an associated temperature reading apparatus via an intrinsically safe barrier. Both the associated temperature reading apparatus and the intrinsically safe barrier are placed in the safe area. The thermocouple, in this usage, and other devices that are used on the hazardous side of an intrinsically safe environment are commonly referred to as field devices.

The limitations of existing intrinsic safety device implementations are numerous. The current IO devices that are software configurable do not support intrinsically safe applications. External intrinsic safety devices have to be added to software configurable IO devices in order to allow these devices to be used in a hazardous application. Unfortunately, these external intrinsic safety devices take up additional space, require a separate enclosure and dedicated custom wiring in order to be connected to the desired field device.

SUMMARY

This Summary is provided to present a summary to briefly indicate the nature and substance of this Disclosure. It is submitted with the understanding that it will not be used to interpret or limit the scope or meaning of the claims.

Disclosed embodiments comprise an intrinsic barrier device for isolating a communication channel of an input/output (IO) module from a field device. The intrinsic barrier device includes a front end having a programming input adapted to receive an analog input (AI), analog output (AO), digital input (DI) or digital output (DO) IO type configuration signal. The intrinsic barrier device also includes a processor to process the IO type configuration signal and an associated memory device storing an intrinsic barrier IO type configuration (IBTC) program. The processor is programmed to implement the IBTC program. The processor, responsive to the IO type configuration signal configures the intrinsic barrier device to operate as the AI, AO, DI or DO for supporting communications through the intrinsic barrier device over the communication channel between the IO module and the field device in the AI, AO, DI or DO.

One disclosed embodiment comprises a method for isolating a communication channel of an input/output (IO) module from a field device. The method includes providing an intrinsic barrier device having a front end including a programming input adapted to receive an AI, AO, DI or DO IO type configuration signal. The intrinsic barrier device further has a processor and a memory device that stores a disclosed IBTC program. The processor runs the IBTC program. The processor, responsive to the IO type configuration signal, configures the intrinsic barrier device to operate as the AI, AO, DI or DO for supporting communications through the intrinsic barrier device over the communication channel between the IO module and the field device in the AI, AO, DI or DO.

DETAILED DESCRIPTION

Figure 1:
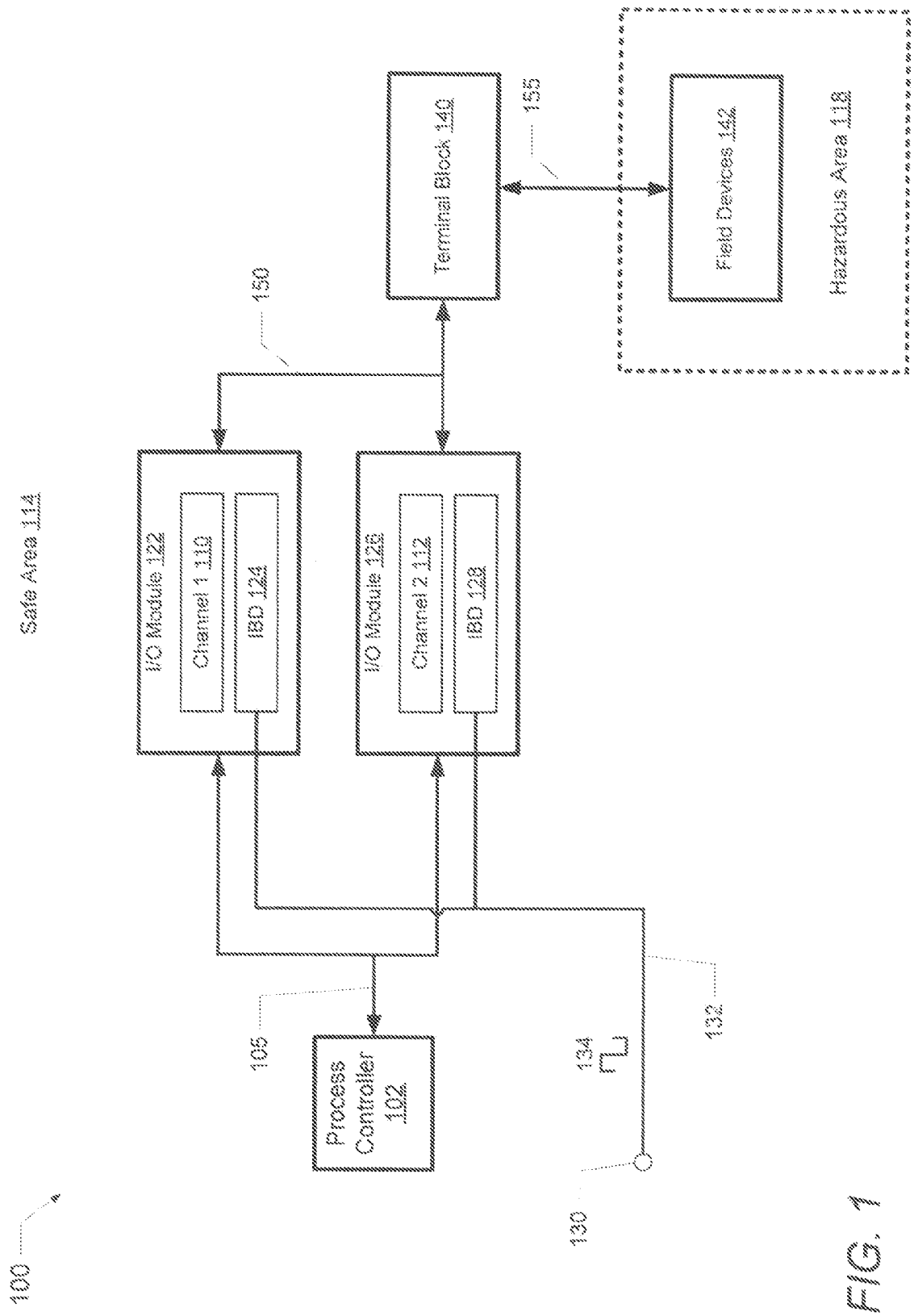
FIG. 1 is a block diagram of an IO module with an internal intrinsic barrier device isolating a field device, according to an example embodiment.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Referring to FIG. 1, a system 100 for selectively isolating one or more field devices 142 located in a hazardous area 118 is shown. The system 100 includes a process controller 102 that is in communication with IO modules 122 and 126 via communication connection 105. Communication connection 105 can be wires, cables or a wireless connection. IO modules 122 and 126 are configurable or programmable IO modules that can support N communication channels and are adapted to be coupled to the field devices 142. IO module 122 supports communication channel 1 110 and IO module 126 supports communication 122 have hundreds or thousands of channels. Each IO module can also support more than one communication channel. The signal mode for each channel is independently configurable via control signals from process controller 102. The signal modes are provided on communication connection 150 to terminal block 140 and include an AO mode, a DO mode, an AI mode and a DI mode. Communication connection 150 can be wires or cables. Further details of IO modules 122 and 126 are disclosed in U.S. Pat. No. 8,392,626 to Wormmeester et al. which is incorporated by reference herein.

Terminal block 140 provides multiple connection points wires and/or cable connections. Terminal block 140 is connected to field devices 142 by a communication connection 155. The process controller 102, IO modules 122 and 126 and terminal block 140 are located in a safe area 114. Field devices 142 are located in hazardous area 118.

IO module 122 includes an integral configurable intrinsic barrier device (IBD) 124 and IO module 126 includes an integral IBD 128. IBD 124 and 128 are internal to IO modules IO modules 122 and 126. IBD 124 and 128 can be programmed to selectively isolate one or more field devices 142 over communication channels 110 and 112. IBD 124 and 128 are connected to a programming input terminal 130 via a communication connection 132. The programming input terminal 130 is adapted to receive an AI, AO, DI or DO IO type configuration signals 134. In another embodiment, the AI, AO, DI or DO IO type configuration signals 134 from process controller 102 is transmitted over communication connection 105 to IBD 124 and 128 via IO modules 122 and 126 respectively.

Figure 2:
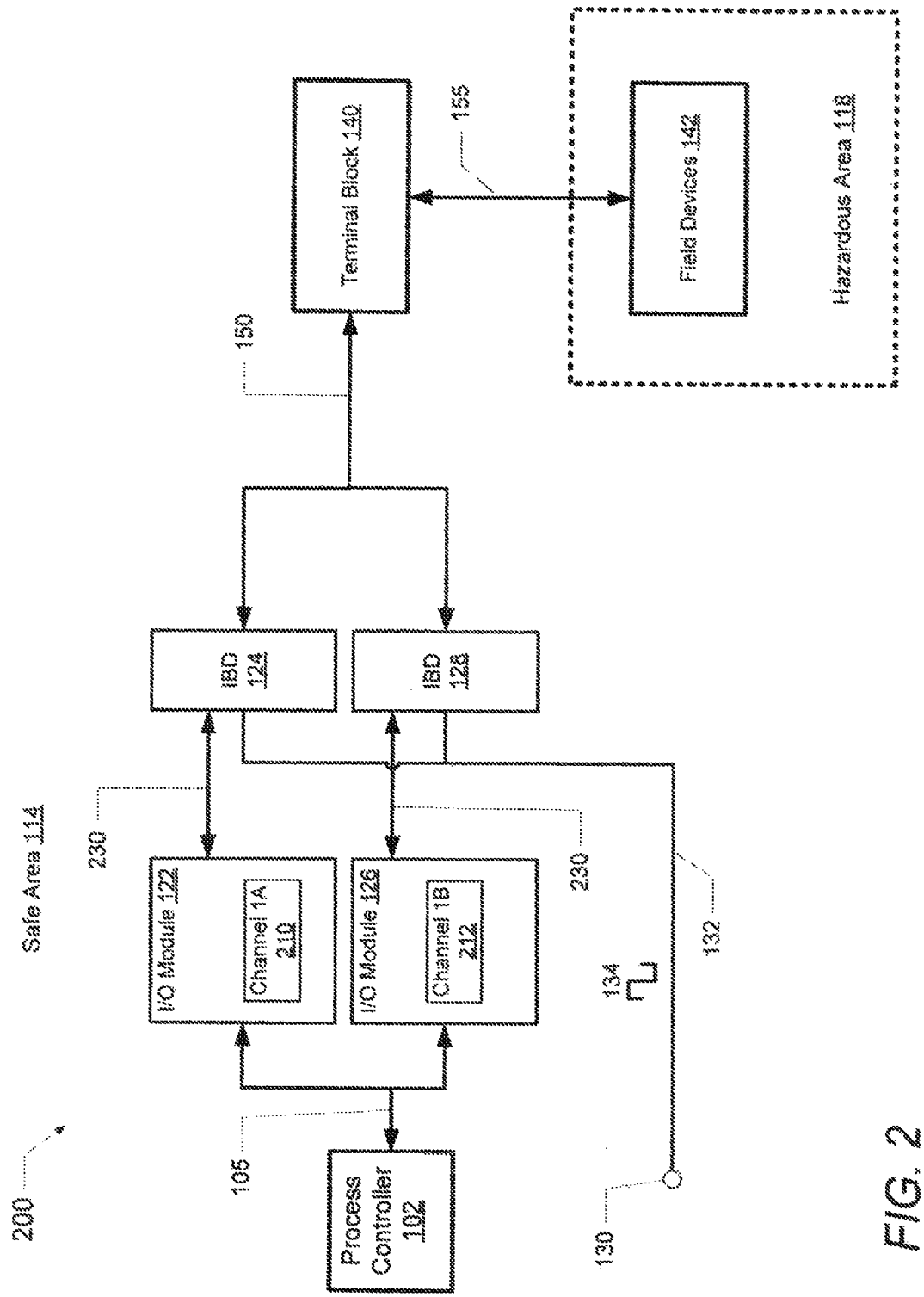
FIG. 2 is a block diagram of an IO module with an external intrinsic barrier device isolating a field device, according to an example embodiment.

Referring to FIG. 2, a system 200 for selectively isolating one or more field devices 142 located in a hazardous area 118 is shown. The system 200 includes a process controller 102 that is in communication with input output (IO) modules 122 and 126 via communication connection 105. As described above, communication connection 105 can be wires, cables or a wireless connection. IO modules 122 and 126 are configurable or programmable IO modules that can support N communication channels and are adapted to be coupled to the field devices 142. IO module 122 supports communication channel 1A 210 and IO module 126 supports a redundant (second) communication channel 1B 212.

The use of redundant communication channels 210 and 212 enhances the reliability of system 200 by providing redundant communication paths to field devices 142. While two communication channels 210 and 212 are shown, system 100 can have hundreds or thousands of channels. The signal mode for each channel is independently configurable via control signals from process controller 102. The signal modes are provided on communication connection 230 to IBD 124 and 128 and include an AO mode, a DO mode, an AI mode and a DI mode. Communication connection 230 can be wires or cables. Terminal block 140 provides multiple connection points wires and/or cable connections. Terminal block 140 is connected to field devices 142 by a communication connection 155. The process controller 102, IO modules 122 and 126 and IBD 124 and 128 and terminal block 140 are located in a safe area 114. Field devices 142 are located in hazardous area 118.

IO module 122 is connected to an IBD 124 via communication connection 230 and IO module 126 is connected to an IBD 128 via communication connection 230. IBD 124 and 128 are external to and physically separated from IO modules 122 and 126. IBD 124 and 128 are connected to terminal block 140 by a communication connection 150. IBD 124 and 128 can be programmed to selectively isolate one or more field devices 142 over communication channels 210 and 212. IBD 124 and 128 are connected to a programming input terminal 130 via a communication connection 132. The programming input terminal 130 is adapted to receive an AI, AO, DI or DO IO type configuration signals 134. In another embodiment, the AI, AO, DI or DO IO type configuration signals 134 from process controller 102 is transmitted over communication connection 105 to IBD 124 and 128 via IO modules 122 and 126 respectively.

Figure 3:
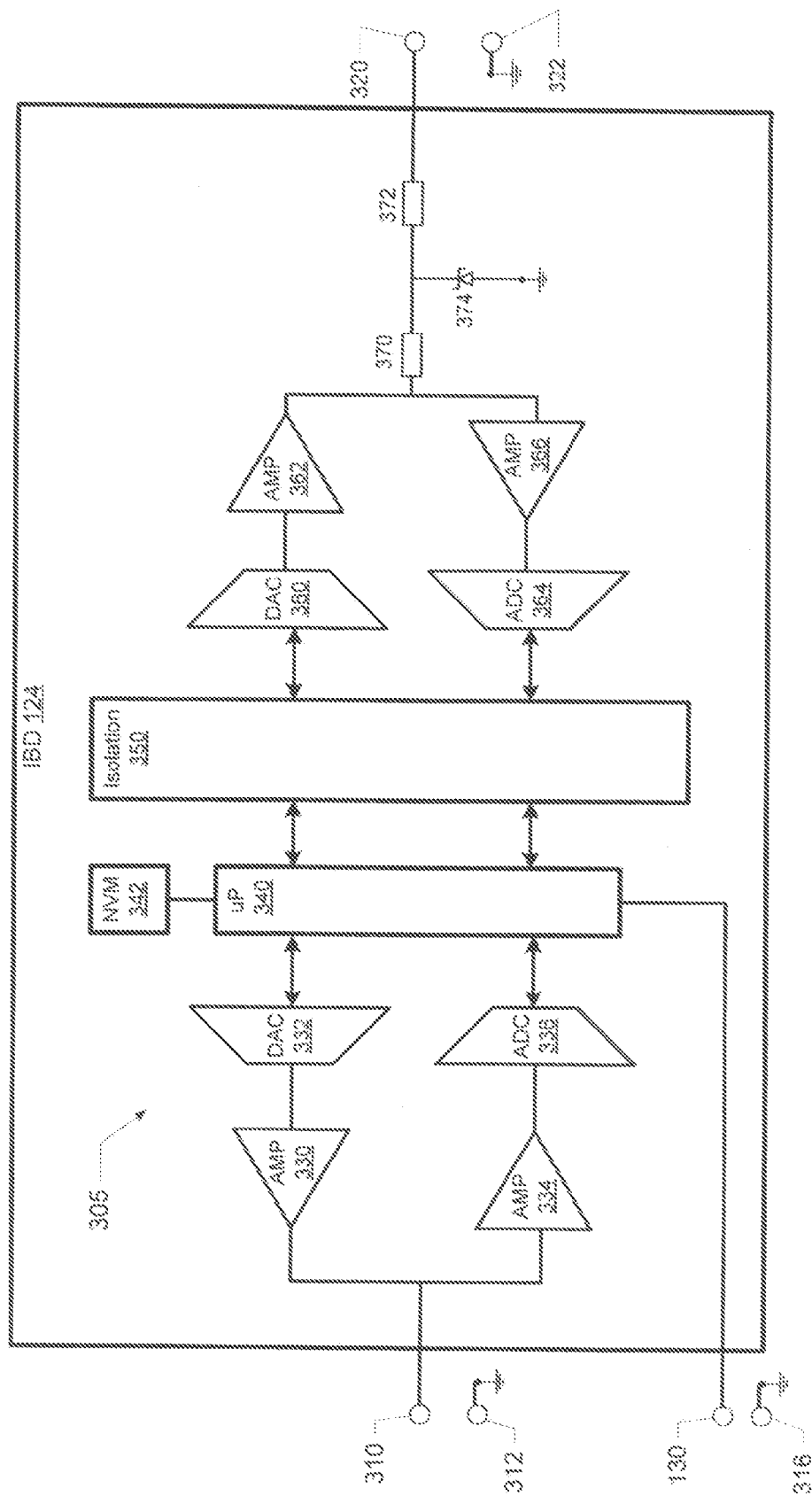
FIG. 3 is a block diagram of an intrinsic barrier device, according to an example embodiment.

FIG. 3 illustrates details of IBD 124. IBD 124 includes terminal 310, ground 312, programming input terminal 130 and ground terminal 316. Terminal 310 is connected to communication connection 230 (FIG. 2). IBD 124 also includes terminal 320 and ground 322. Terminal 320 is connected to communication connection 150 (see FIG. 2). Terminal 310 is connected to the output of operational amplifier (AMP) 330 and to the input of AMP 334. The input of AMP 330 is connected to the output of a digital to analog converter (DAC) 332. The output of AMP 334 is connected to the input of an analog to digital converter (ADC) 336. DAC 332 and ADC 336 are connected to and in communication with the processor 340 shown in FIG. 3 as a μprocessor. Processor 340 can be microprocessor, digital signal processor (DSP), or microcontroller unit (MCU). IBD 124 includes a front end 305 that comprises AMP 330, DAC 332, AMP 334, ADC 336 and programming input terminal 130.

Processor 340 is connected to and in communication with a non-volatile memory device (NVM) 342. NVM 342 can store instructions and/or algorithms for execution by processor 340. Processor 340 is connected to and in communication with an isolation device 350. Isolation device 350 provides electrical isolation for IBD 124 between terminals 310 and 320. Isolation device 350 can be a galvanic isolation device such as an opto-isolator (also called an optocoupler, photocoupler, or optical isolator) or a transformer.

Isolation device 350 is connected to the input of DAC 360 and the output of ADC 364. The output of DAC 360 is connected to the input of AMP 362. The input ADC 364 is connected to the output of AMP 366. The output of AMP 362 and the input of AMP 366 are connected to one end of a current limiting device 370. Current limiting device 370 can be a passive device such as a resistor or fuse, or can be an active device such as a transistor circuit. The other end of current limiting device 370 is connected to the junction of another current limiting device 372 and a voltage limiting device such as zener diode 374. One end of zener diode 374 is connected to ground. The other end of current limiting device 372 is connected to terminal 320.

During operation, processor 340 reads DAC 332, DAC 360 and/or ADC 336, ADC 364 and programming input terminal 130 and determines the IO type configuration signal (e.g. AI, AO, DI or DO). Processor 340 drives the appropriate DAC or ADC depending on the IO type configuration signal. The output signals pass through the zener diode 374 and current limiting devices 370 and 372.

For AO implementation, the signal path is from IO module 122, through AMP, 334, ADC 336, processor 340, isolation device 350, DAC 360, AMP 362, current limiting devices 370 and 372, zener diode 374, terminal 320, terminal block 140 and then to field devices 142. ADC 336 converts the incoming analog signal to a digital signal. DAC 360 converts the outgoing digital signal to an analog signal.

For DO implementation, the signal path is from IO module 122, through AMP 334, ADC 336, processor 340, isolation device 350, DAC 360, AMP 362, current limiting devices 370 and 372, zener diode 374, terminal 320, and to the terminal block 140 and then to field devices 142 shown in FIG. 2.

For AI implementation, the signal path is from field devices 142 through terminal block 140 shown in FIG. 2, to terminal 320, current limiting devices 370 and 372, zener diode 374, AMP 366, ADC 364, isolation device 350, processor 340, DAC 332, AMP 330 to terminal 310. ADC 364 converts the incoming analog signal to a digital signal. DAC 332 converts the outgoing digital signal to an analog signal.

For DI implementation, the signal path is from field devices 142 through terminal block 140 shown in FIG. 2, to terminal 320, current limiting devices 370 and 372, zener diode 374, AMP 366, ADC 364, isolation device 350, processor 340, DAC 332, AMP 330 to terminal 310.

Figure 4:
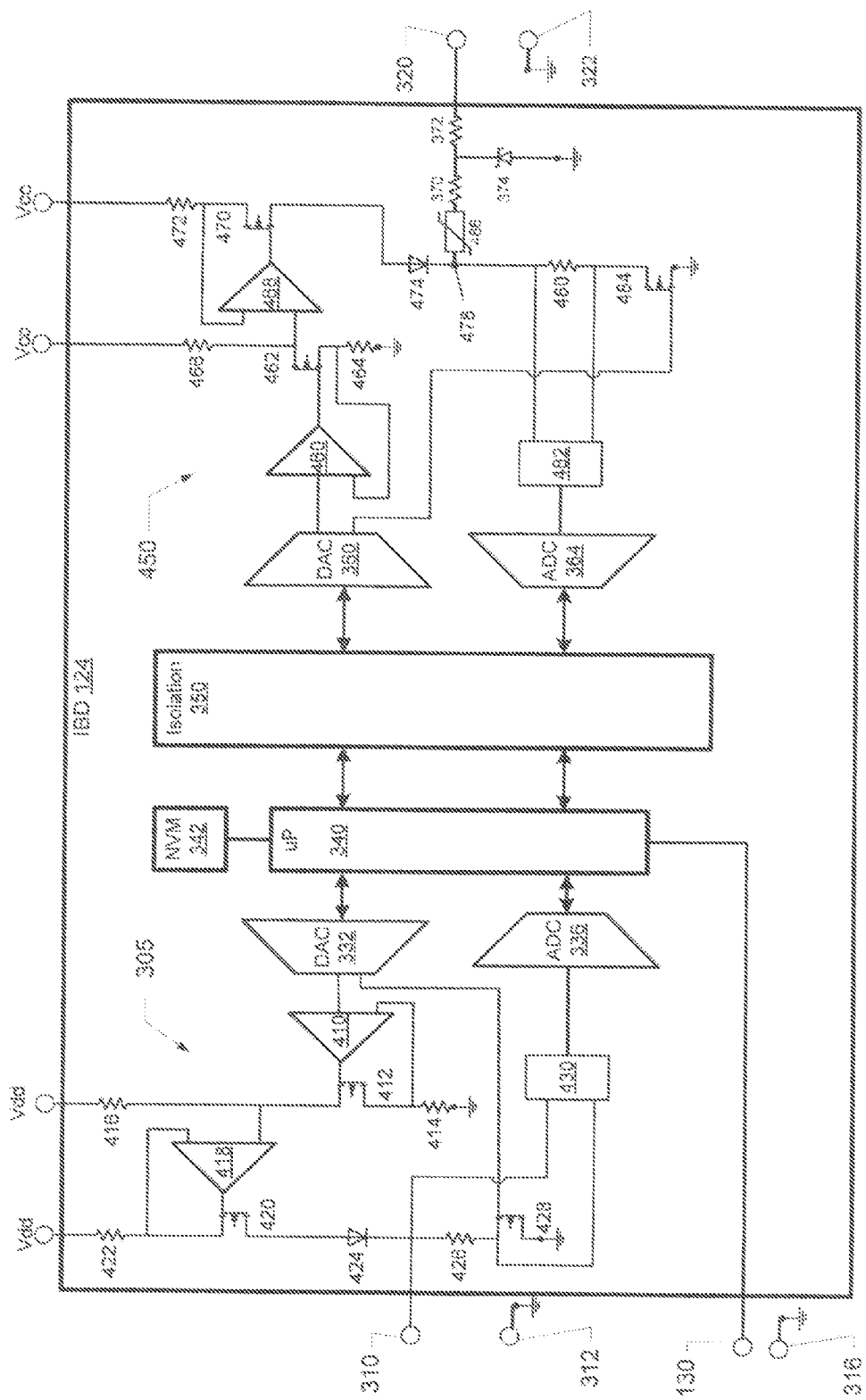
FIG. 4 is a schematic diagram of an intrinsic barrier device, according to an example embodiment.

FIG. 4 illustrates additional details of IBD 124. Front end 305 further comprises an AMP 410 having one input connected to the output of DAC 332 and another input connected through resistor 414 to ground. The output of AMP 410 is connected to a switch such as a field effect transistor (FET) 412. The output of AMP 410 is connected to the input or gate of FET 412. FET 412 has a terminal (drain) connected to resistor 414 and another terminal (source) connected to resistor 416 and the input of AMP 418. Resistor 416 is connected to voltage source Vdd. The output of AMP 418 is connected to the input or gate of FET 420. FET 420 has a terminal (drain) connected to one end of diode 424 and another terminal (source) connected to resistor 422 and the input of AMP 418. Resistor 422 is connected to voltage source Vdd.

The other end of diode 424 is connected through resistor 426 to the source of FET 428 and to the input of multiplexer (MUX) 430. The drain of FET 428 is connected to ground and the gate of FET 428 is connected to an output of DAC 332. Terminal 310 is connected to an input of MUX 430. The output of MUX 430 is connected to the input of ADC 336.

IBD 124 further includes a back end 450 that comprises an AMP 460 having one input connected to the output of DAC 360 and another input connected through resistor 464 to ground. The output of AMP 460 is connected to the input or gate of FET 462. FET 462 has a terminal (drain) connected to resistor 464 and another terminal (source) connected to resistor 466 and the input of AMP 468. Resistor 466 is connected to voltage source Vcc. The output of AMP 468 is connected to the input or gate of FET 470. FET 470 has a terminal (drain) connected to one end of diode 474 and another terminal (source) connected to resistor 472 and the input of AMP 468. Resistor 472 is connected to voltage source Vcc.

The other end of diode 474 is connected to node 478. Node 478 is connected to resistor 480 and to the input of MUX 482. The other end of resistor 480 is connected to the source of FET 484. The drain of FET 484 is connected to ground and the gate of FET 484 is connected to an output of DAC 360. Another input of MUX 482 is connected to the junction of resistor 480 and the source of FET 484. The output of MUX 482 is connected to the input of ADC 364. Node 478 is connected to one end of varistor 486. The other end of varistor 486 is connected to an end of the current limiting device (e.g., resistor) 370. The other end of the current limiting device 370 is connected to the junction of one end of the current limiting device (e.g., resistor 372) and zener diode 374. The other end of zener diode 374 is connected to ground. The other end of current limiting device 372 is connected to terminal 320.

With continued reference to FIG. 4, the operation of IBD 124 in the AO, DO, AI and AO modes will now be described. For AO implementation, The FET 428 is switched ON by the DAC 332. The analog signal voltage is measured across the resistor 426 by the ADC 336 through the MUX 430. The processor 340 then sends this signal across the isolation 350 to the DAC 360. The analog signal output from the DAC 360 is level shifted by the AMP 460 and the FET 462 along with resistors 464, 466. The components AMP 468, FET 470 and resistor 472 components convert the signal to the required current output which then flows through the current limiting devices 370 and 372, zener diode 374, terminal 320, terminal block 140 and then to field devices 142.

For DO implementation, the signal voltage is measured at the terminal 310 by the ADC 336 through the MUX 430. The processor 340 then sends this signal across the isolation 350 to the DAC 360. The signal output from the DAC 360 is level shifted by the AMP 460 and the FET 462 along with resistors 464. 466. The components AMP 468, FET 470 and resistor 472 components convert the signal to the required voltage output which then flows through the diode 474 and current limiting devices 370 and 372, zener diode 374, terminal 320, terminal block 140 and then to field devices 142.

For AI implementation, the signal path is from field devices 142 through terminal block 140 shown in FIG. 2, to terminal 320, current limiting devices 370, 372 and zener diode 374. The DAC 360 switches on FET 484. The voltage across resistor 480 is measured by the ADC 364 through the MUX 482. The processor 340 then reads the ADC 364 through the isolation 350 and commands the DAC 332. The signal output from the DAC 332 is level shifted by AMP 410, FET 412 and resistors 414, 416. The components AMP 418, FET 420 and resistor 422 components convert the signal to the required current output which then flows through the diode 424 to the terminal 310.

For DI implementation, the signal path is from field devices 142 through terminal block 140 shown in FIG. 2, to terminal 320, current limiting devices 370, 372 and zener diode 374. The voltage at node 478 is measured by the ADC 364 through the MUX 482. The processor 340 then reads the ADC 364 through the isolation 350 and commands the DAC 332. The signal output from the DAC 332 is level shifted by AMP 410, FET 412 and resistors 414, 416. The components AMP 418, FET 420 and resistor 422 components convert the signal to the required voltage output which goes through the diode 424 to the terminal 310.

Figure 5:
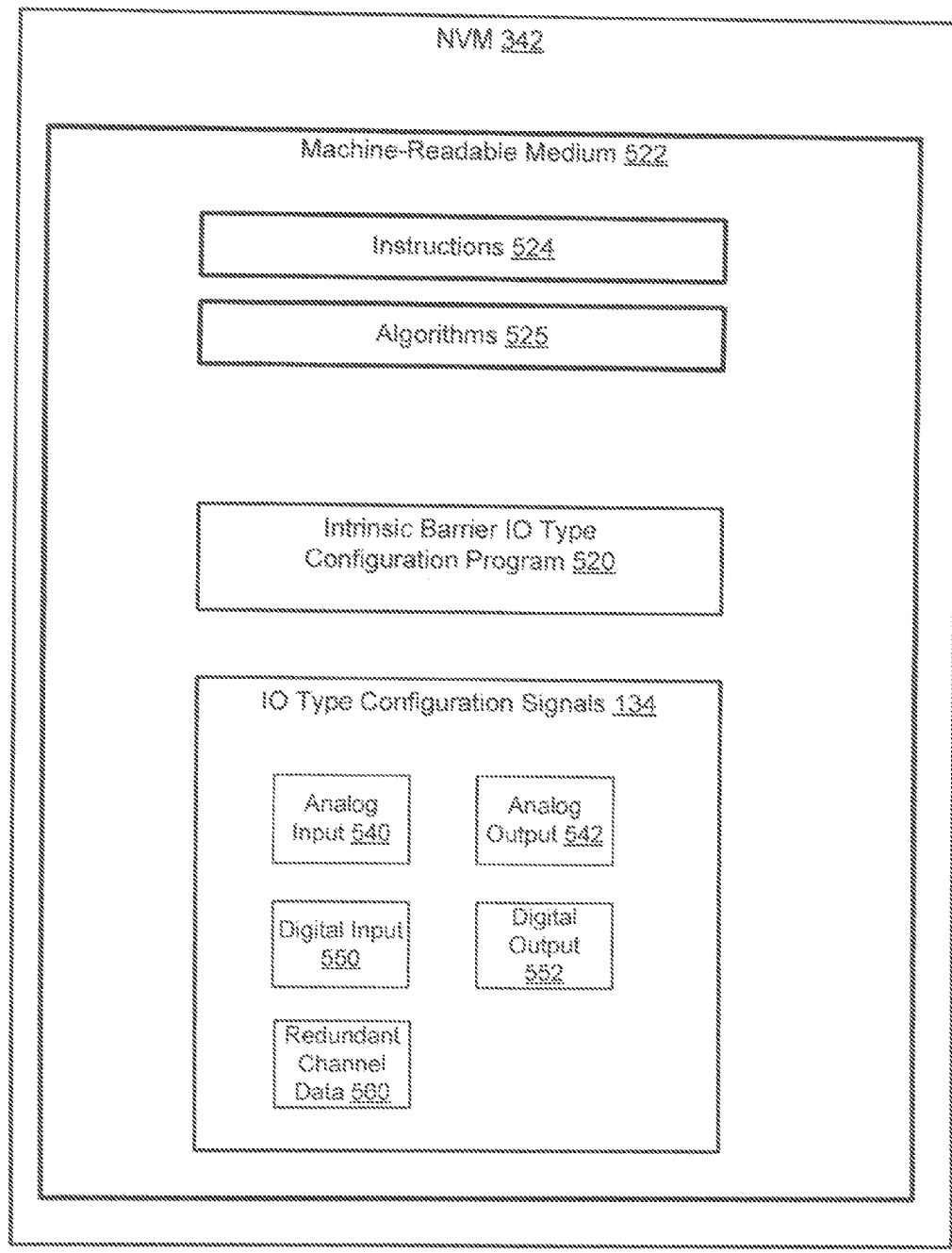
FIG. 5 is an example illustration of contents of a computer readable storage medium stored in a non-volatile memory device, according to an example embodiment.

Turning to FIG. 5, contents of NVM 342 are shown. NVM 342 includes a machine-readable medium 522 on which is stored one or more sets of software such as instructions 524 and/or algorithms 525 embodying any one or more of the methodologies or functions described herein. The instructions 524 and/or algorithms 525 can also reside, completely or at least partially, within the NVM 342 and/or within the processor 340 during execution thereof. An intrinsic barrier IO type configuration (IBTC) program 520 is also stored in machine-readable medium 522. Processor 342 is programmed to implement the IBTC program 520. IBTC program 520 isolates a communication channel of an IO module from a field device. Machine-readable medium 522 further stores IO type configuration signals 134 that are received from programming input terminal 130. IO type configuration signals 134 include AI signals 540, AO signals 542, DI signals 550 and DO signals 552.

Figure 6:
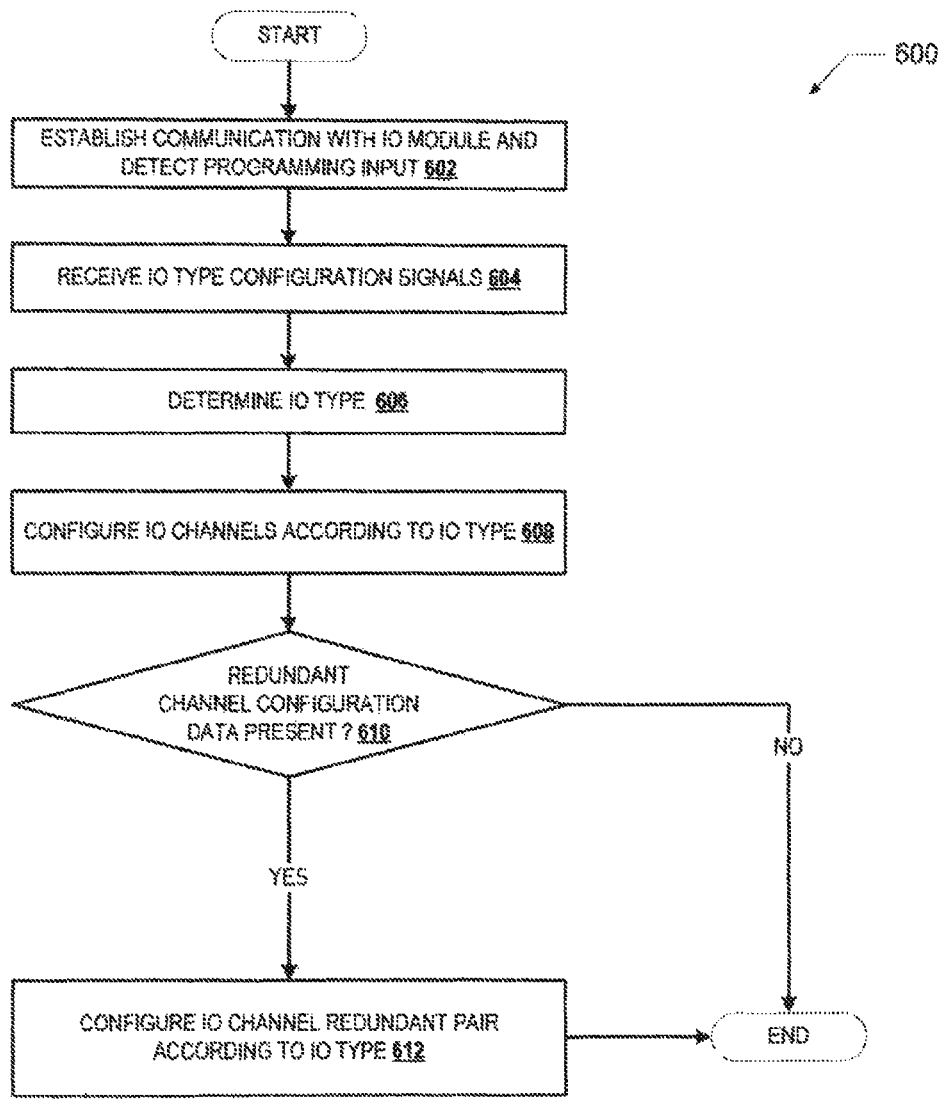
FIG. 6 is a flow chart that shows steps in an example method of isolating a communication channel of an IO module from a field device, according to an example embodiment.

Referring to FIG. 6, a flow chart showing steps in an exemplary method 600 for isolating a communication channel of an IO module from a field device is shown. With reference to FIGS. 1-6, method 600 can be implemented via the execution of instructions 524 and/or algorithms 525 by processor 340 and specifically by the execution of IBTC program 520 by processor 340.

Method 600 begins at the start block and proceeds to block 602. At block 602, processor 340 triggers IBD 124 to establish communications with IO module 122 and detects IO type configuration signals 134 at programming input terminal 130. Processor 340 receives the IO type configuration signals 134 (block 604). Processor 340 determines the IO type (e.g. AI 540, AO 542, DI 550 or DO 552) associated with the IO type configuration signal (block 606). At block 608, processor 340 configures IBD 124 to operate as the AI, AO, DI or DO for supporting communications through communication channel 1 110 or 1A 210 between IO module 122 and field device 142 in the AI, AO, DI or DO.

Processor 340 determines if the IO type configuration signal 134 contains redundant channel data 560 (decision block 610). In response to the IO type configuration signal not containing redundant channel data, method 600 ends. In response to the IO type configuration signal containing redundant channel data, processor 340 configures IBD 128 as a redundant pair IBD to operate as the AI, AO, DI or DO for supporting communications through communication channel 1B 212 between IO module 126 and field device 142 in the AI, AO, DI or DO. Method 600 then terminates.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

The invention claimed is:

1. An intrinsic barrier device for isolating a communication channel of an input/output (IO) module from a field device, comprising:
   a front end including a programming input adapted to receive an analog input (AI), analog output (AO), digital input (DI) or digital output (DO) IO type configuration signal;
   a processor coupled to process said IO type configuration signal having an associated memory device storing an intrinsic barrier IO type configuration (IBTC) program, said processor programmed to implement said IBTC program, wherein said processor:
      responsive to said IO type configuration signal configures said intrinsic barrier device to operate as said AI, AO, DI or DO for supporting communications through said intrinsic barrier device over said communication channel between said IO module and said field device in said AI, AO, DI or DO.

2. The intrinsic barrier device of claim 1, wherein said intrinsic barrier device is integral with said IO module.

3. The intrinsic barrier device of claim 1, wherein said intrinsic barrier device is external to said IO module.

4. The intrinsic barrier device of claim 1, wherein said intrinsic barrier device receives said IO type configuration signal via said communication channel.

5. The intrinsic barrier device of claim 1, wherein said processor:
   receives a redundant IO type configuration signal for said communication channel; and
   responsive to receiving said redundant IO type configuration signal, configures a redundant intrinsic barrier device to operate as said AI, AO, DI or DO for supporting communications through said redundant intrinsic barrier device over said communication channel between said IO module and said field device in said AI, AO, DI or DO.

6. The intrinsic barrier device of claim 5, wherein said redundant IO type configuration signal is received via said programming input.

7. A method of isolating a communication channel of an input/output (IO) module from a field device, comprising:
   providing an intrinsic barrier device having a front end including a programming input adapted to receive an analog input (AI), analog output (AO), digital input (DI) or digital output (DO) IO type configuration signal, said intrinsic barrier device further having a processor and a memory device storing an intrinsic barrier IO type configuration (IBTC) program, said processor running said IBTC program, wherein said processor:
      responsive to said IO type configuration signal, configuring said intrinsic barrier device to operate as said AI, AO, DI or DO for supporting communications through said intrinsic barrier device over said communication channel between said IO module and said field device in said AI, AO, DI or DO.

8. The method of claim 7, wherein said intrinsic barrier device is integral with said IO module.

9. The method of claim 7, wherein said intrinsic barrier device is external to said IO module.

10. The method of claim 7, wherein said intrinsic barrier device receives said IO type configuration signal via said communication channel.

11. The method of claim 7, further comprising:
    receiving a redundant IO type configuration signal for said communication channel; and
    responsive to receiving said redundant IO type configuration signal, configuring a redundant intrinsic barrier device to operate as said AI, AO, DI or DO for supporting communications through said redundant intrinsic barrier device over said communication channel between said IO module and said field device in said AI, AO, DI or DO.

12. The method of claim 11, wherein said redundant IO type configuration signal is received via said programming input.

13. A computer program product, comprising:
    a memory device having a non-transitory data storage medium that includes program instructions executable by a processor to enable said processor to execute a method for an intrinsic barrier device to isolate a communication channel of an input/output (IO) module from a field device, said intrinsic barrier device including a front end including a programming input adapted to receive an analog input (AI), analog output (AO), digital input (DI) or digital output (DO) IO type configuration signal, said non-transitory data storage medium storing an intrinsic barrier IO type configuration (IBTC) program, said computer program product comprising:

responsive to said IO type configuration signal, code for configuring said intrinsic barrier device to operate as said AI, AO, DI or DO for supporting communications through said intrinsic barrier device over said communication channel between said IO module and said field device in said AI, AO, DI or DO.

14. The computer program product of claim 13, wherein said intrinsic barrier device is integral with said IO module.

15. The computer program product of claim 13, wherein said intrinsic barrier device is external to said IO module.

16. The computer program product of claim 13, further comprising:
   code for receiving said IO type configuration signal via said communication channel.

17. The computer program product of claim 13, further comprising:
   code for receiving a redundant IO type configuration signal for said communication channel; and
   responsive to receiving said redundant IO type configuration signal, code for configuring a redundant intrinsic barrier device to operate as said AI, AO, DI or DO for supporting communications through said redundant intrinsic barrier device over said communication channel between said IO module and said field device in said AI, AO, DI or DO.

18. The computer program product of claim 17, wherein said redundant IO type configuration signal is received via said programming input.

19. The intrinsic barrier device of claim 1, wherein said processor directly receives said IO type configuration signal, wherein said processor configures said intrinsic barrier device to operate as said AI, AO, DI or said DO, and wherein said intrinsic barrier device includes at least two (2) different signal paths for supporting operation in said AI, AO, DI or DO.

20. The computer program product of claim 13, wherein said processor directly receives said IO type configuration signal, further comprising code for said processor configuring said intrinsic barrier device to operate as said AI, AO, DI or said DO.

* * * * *